United States Patent
Cheng et al.

(10) Patent No.: US 9,818,187 B2
(45) Date of Patent: Nov. 14, 2017

(54) DETERMINING LOCAL SPECTRUM AT A PIXEL USING A ROTATIONALLY INVARIANT S-TRANSFORM (RIST)

(71) Applicant: Mayo Foundation for Medical Education and Research, Rochester, MN (US)

(72) Inventors: Chun Hing Cheng, Calgary (CA); Joseph Ross Mitchell, Scottsdale, AZ (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 15/276,667

(22) Filed: Sep. 26, 2016

(65) Prior Publication Data

US 2017/0084013 A1    Mar. 23, 2017

Related U.S. Application Data

(63) Continuation-in-part of application No. 14/360,294, filed as application No. PCT/US2012/066450 on Nov. 23, 2012, now abandoned.

(60) Provisional application No. 61/562,504, filed on Nov. 22, 2011.

(51) Int. Cl.
    G06K 9/36    (2006.01)
    G06T 7/00    (2017.01)

(52) U.S. Cl.
    CPC .. *G06T 7/0012* (2013.01); *G06T 2207/10088* (2013.01); *G06T 2207/20048* (2013.01); *G06T 2207/30016* (2013.01)

(58) Field of Classification Search
    None
    See application file for complete search history.

(56) References Cited

U.S. PATENT DOCUMENTS

| | | |
|---|---|---|
| 6,803,919 B1 | 10/2004 | Kim et al. |
| 7,259,767 B2 | 8/2007 | Mitchell et al. |
| 8,458,240 B2 | 6/2013 | Brown |
| 2002/0159644 A1 | 10/2002 | Sakuyama |
| 2003/0123743 A1 | 7/2003 | Zandi et al. |
| 2006/0083407 A1 | 4/2006 | Zimmermann et al. |
| 2007/0027657 A1 | 2/2007 | Pinnegar et al. |
| 2009/0161945 A1 | 6/2009 | Morgan-Mar et al. |
| 2009/0285462 A1* | 11/2009 | Drabycz ............... G06K 9/527 382/128 |
| 2010/0008589 A1 | 1/2010 | Bober et al. |
| 2015/0125080 A1 | 5/2015 | Cheng |

(Continued)

OTHER PUBLICATIONS

Brown and Frayne, "A fast discrete S-transform for biomedical signal processing," Engineering in Medicine and Biology Society, 2008. EMBS 2008. 30th Annual International Conference of the IEEE , pp. 2586-2589, Aug. 20-25, 2008.

(Continued)

*Primary Examiner* — Atiba O Fitzpatrick
(74) *Attorney, Agent, or Firm* — Fish & Richardson P.C.

(57) ABSTRACT

An image processing device and methods for performing Rotationally Invariant S-transform (RIST) for an image are provided herein. An example method of determining the RIST magnitude at a pixel is provided herein. Further, an example method of determining RIST magnitudes and statistics in a region of interest is provided herein.

16 Claims, 11 Drawing Sheets

(56) References Cited

U.S. PATENT DOCUMENTS

2015/0193671 A1    7/2015   Cheng
2017/0103537 A1    4/2017   Cheng et al.

OTHER PUBLICATIONS

Drabycz, "Efficient S-transform techniques for magnetic resonance imaging", Ph.D. Thesis 2009.

Hu et al., "Multi-Parametric MRI and Texture Analysis to Visualize Spatial Histologic Heterogeneity and Tumor Extent in Glioblastoma," *PLoS One*, 10(11):e0141506, Nov. 24, 2015.

Hu et al., "Radiogenomics to characterize regional genetic heterogeneity in glioblastoma," Neuro Oncol., pii: now135. Epub Aug 8, 2016.

International Preliminary Report on Patentability and Written Opinion for PCT/US2012/066450 dated May 27, 2014, 11 pages.

International Preliminary Report on Patentability for PCT/US2012/066403, dated May 27, 2014, 5 pages.

International Search Report and Written Opinion for PCT/US2012/066403, dated Mar. 29, 2013, 8 pages.

International Search Report for PCT/US2012/066450 dated Feb. 5, 2013, 2 pages.

Mansinha et al., "Local S-spectrum analysis of 1-D and 2-D data," *Physics of the Earth and Planetary Interiors*, 103(3-4):329-336, Nov. 15, 1997.

Mansinha et al., "Pattern analysis with two-dimensional spectral localisation: Applications of two-dimensional S transforms," Physica A: Statistical Mechanics and its Applications, 239(1):286-295, May 1, 1997.

Stockwell et al., "Localization of the complex spectrum: the S transform," IEEE transactions on signal processing, 44(4):998-1001, Apr. 1996.

Stockwell, "Why use the S-transform?" AMS Pseudo-differential operators: Partial differential equations and time-frequency analysis, 52:279-309, Jan. 2007.

Wang and Orchard, "On the use of the stockwell transform for image compression," *Proceedings of the SPIE*, vol. 7245, id. 724504, 2009.

\* cited by examiner

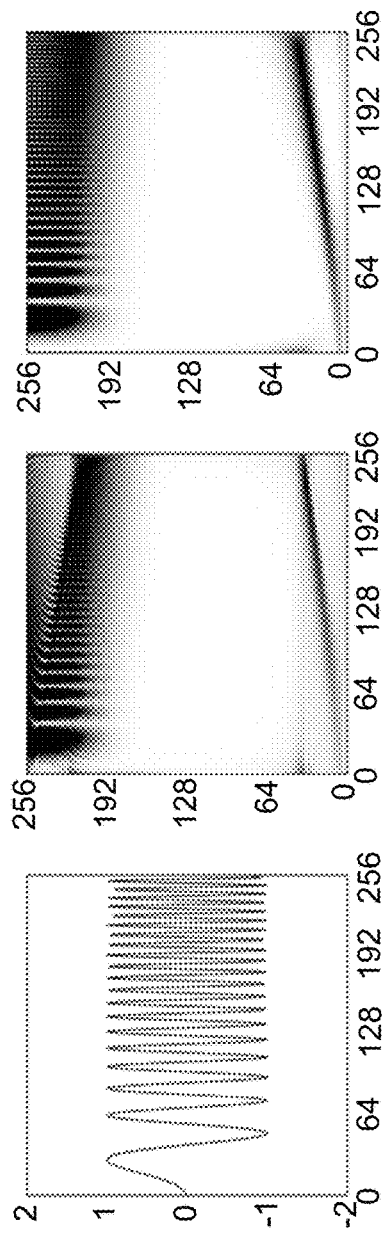
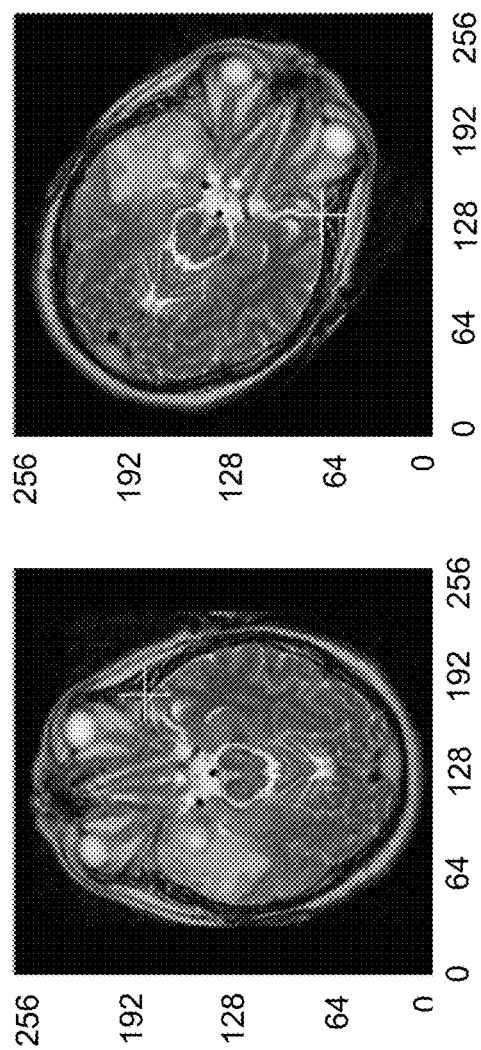
FIG. 1A  FIG. 1B  FIG. 1C
FIG. 2A  FIG. 2B

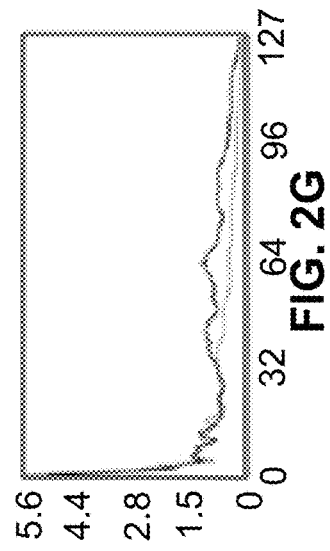
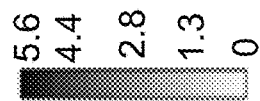
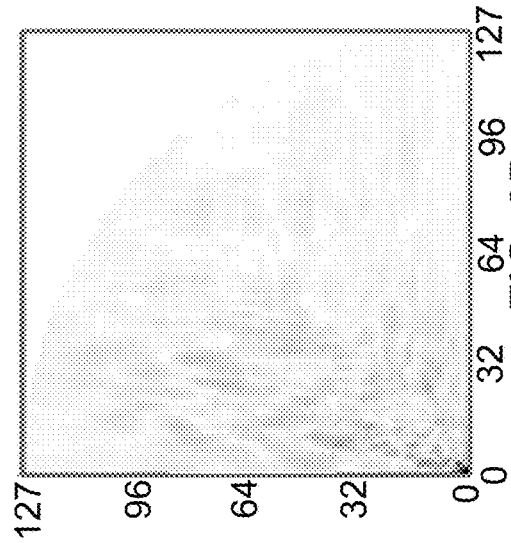
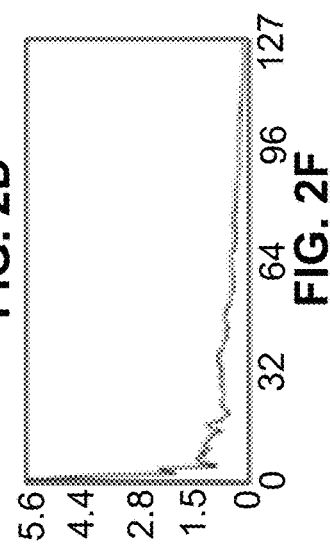
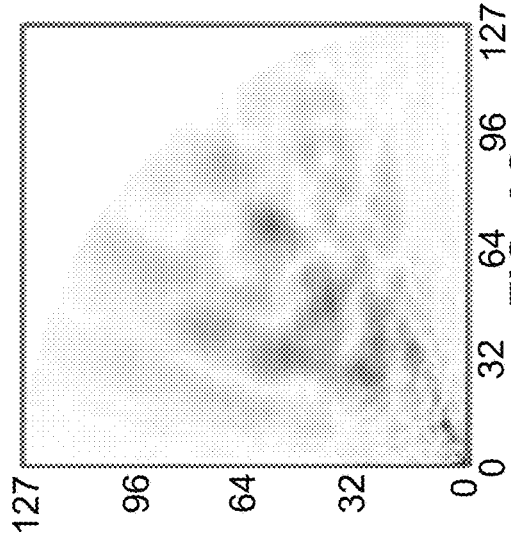
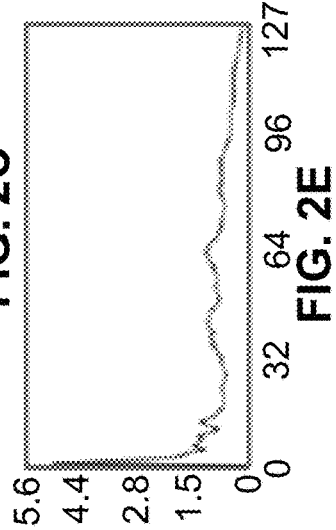
FIG. 2C  FIG. 2D  FIG. 2E  FIG. 2F  FIG. 2G

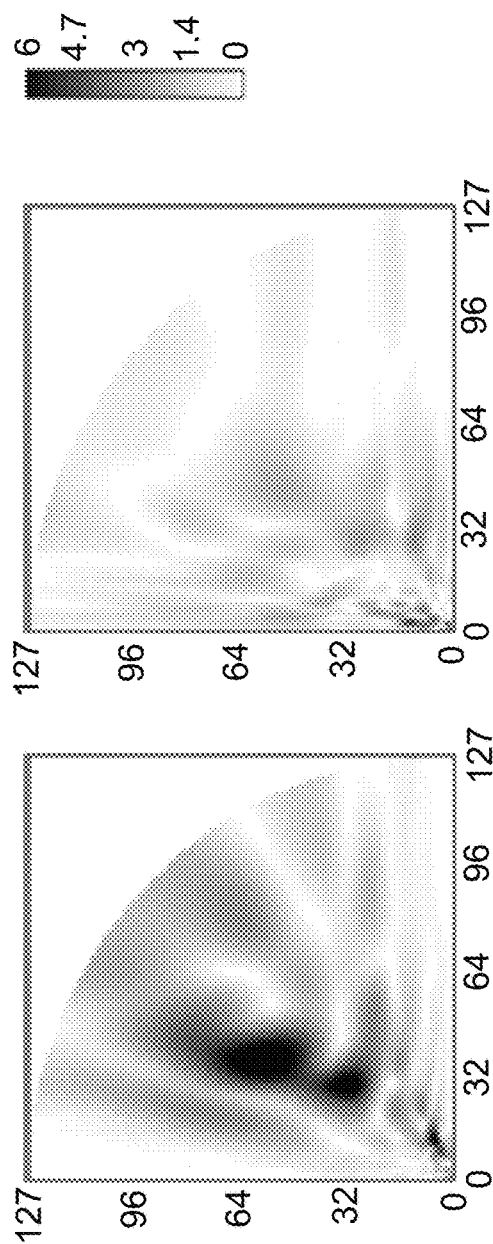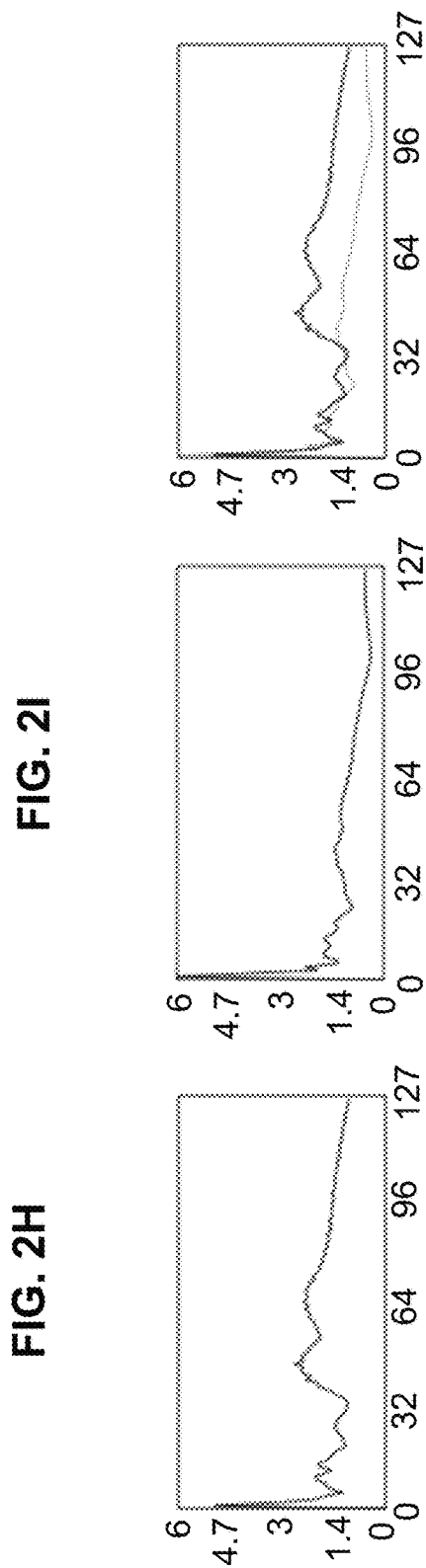

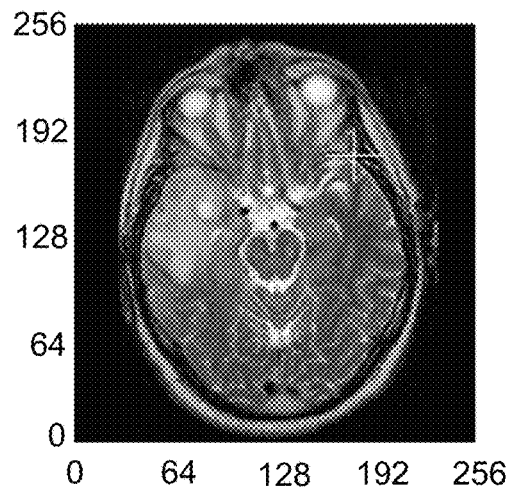
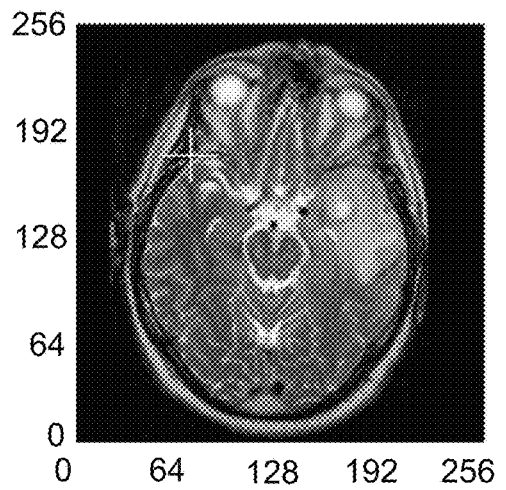
FIG. 3A  FIG. 3B
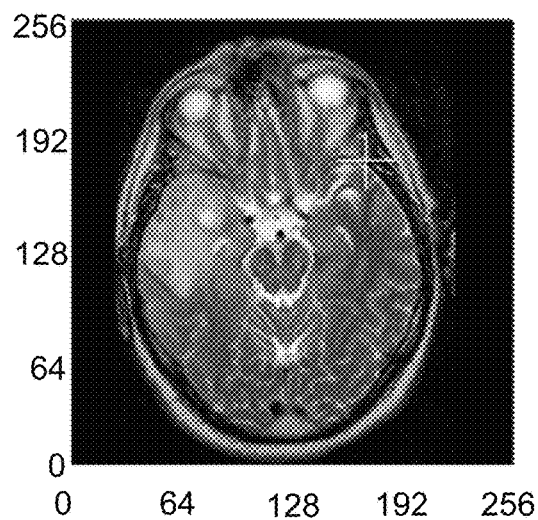
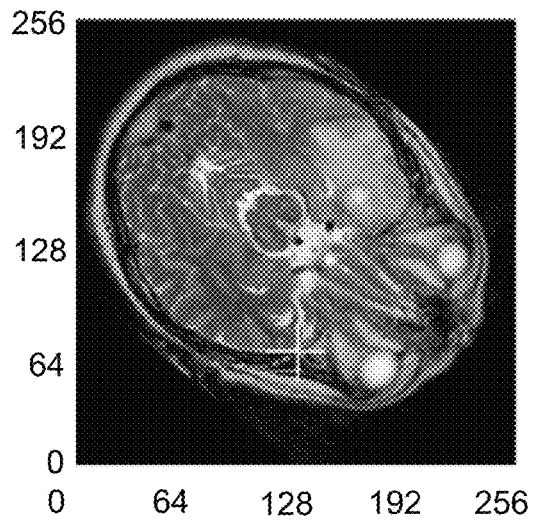
FIG. 4A  FIG. 4B

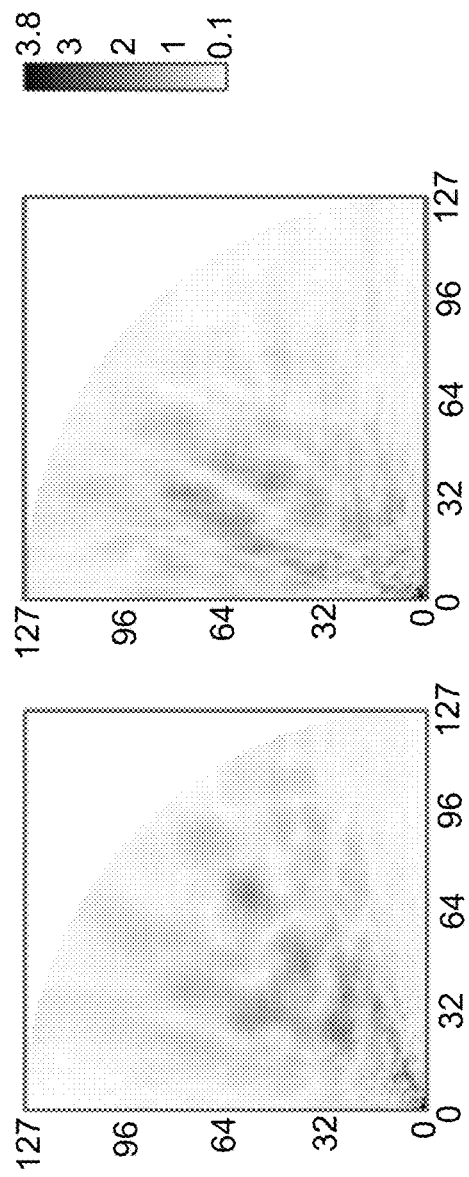
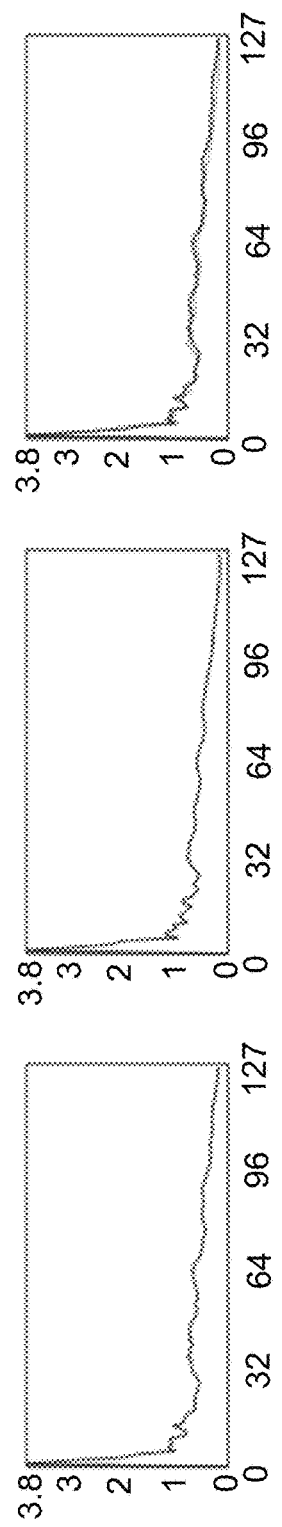
FIG. 4C  FIG. 4D  FIG. 4E  FIG. 4F  FIG. 4G

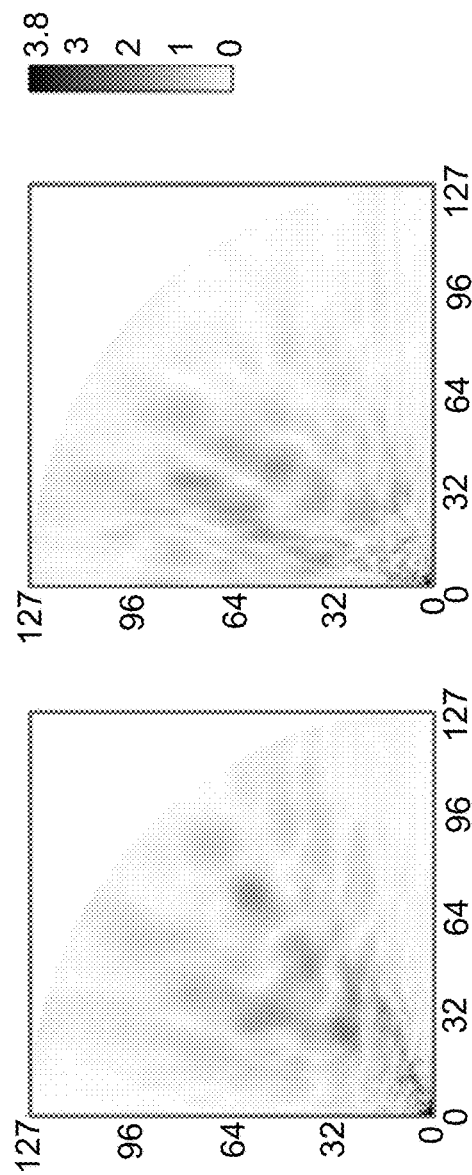
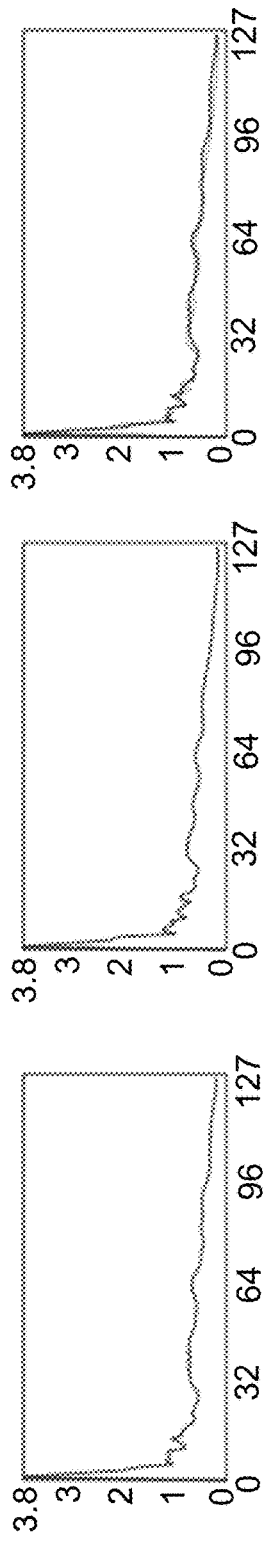
FIG. 4H  FIG. 4I
FIG. 4J  FIG. 4K  FIG. 4L

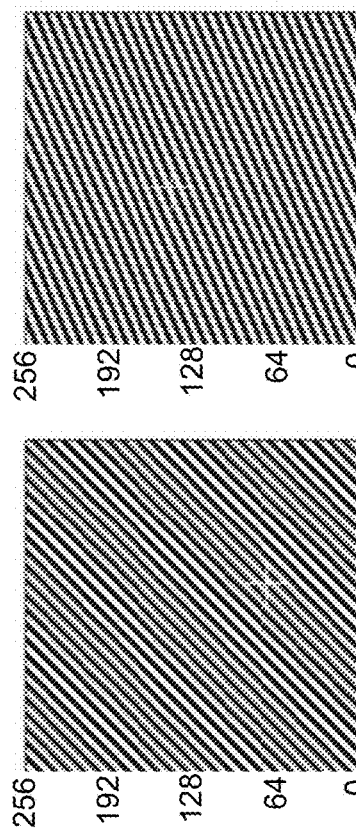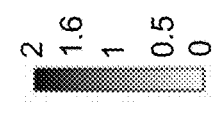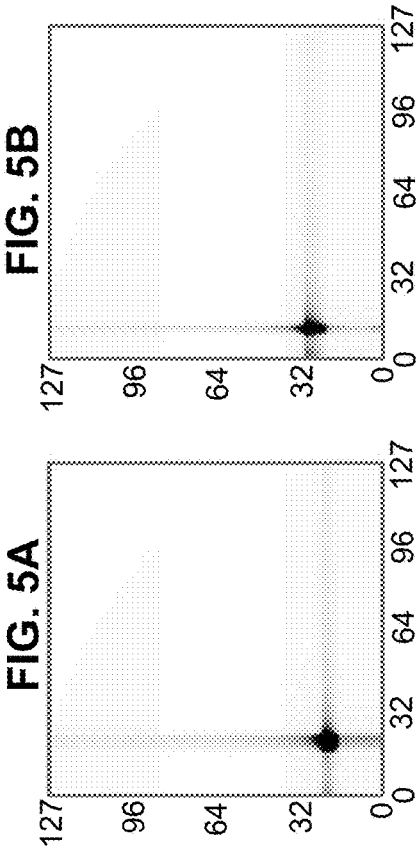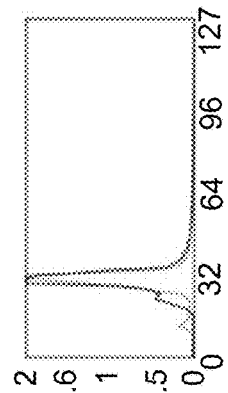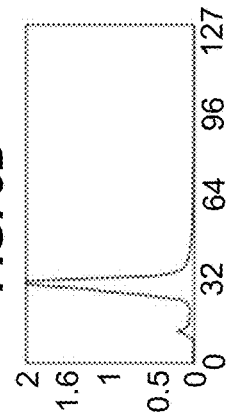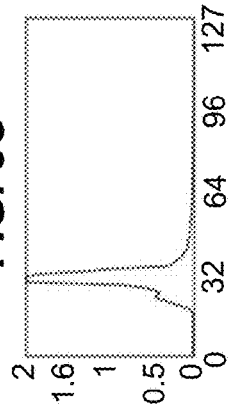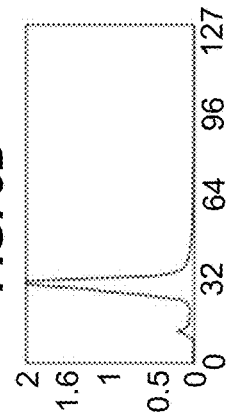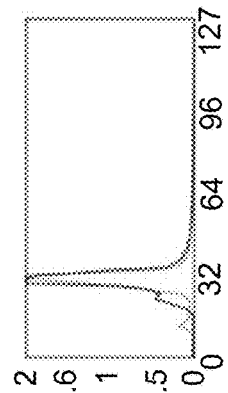

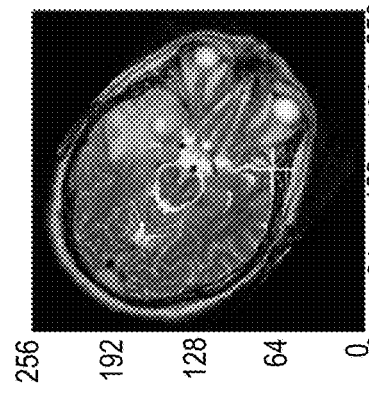
FIG. 6B
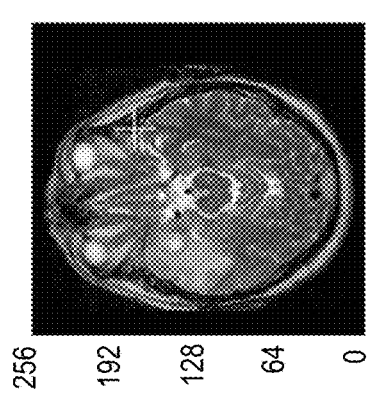
FIG. 6A
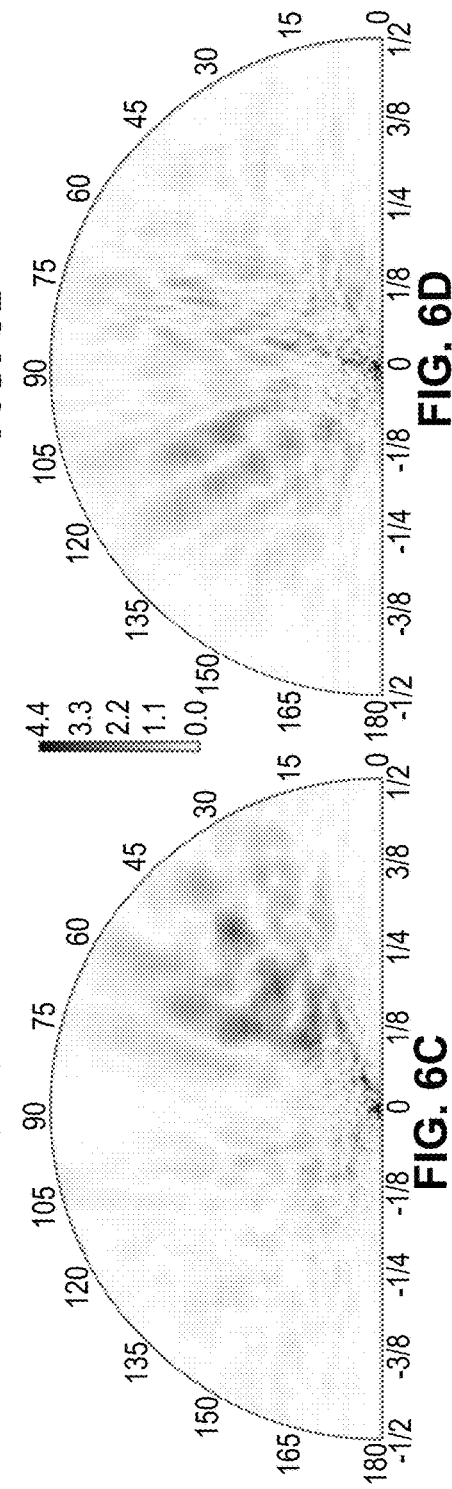
FIG. 6C
FIG. 6D
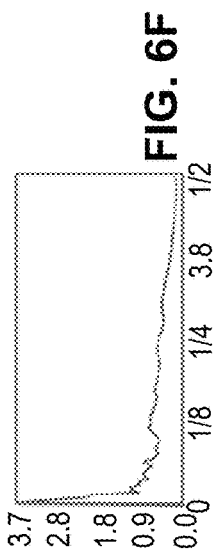
FIG. 6F
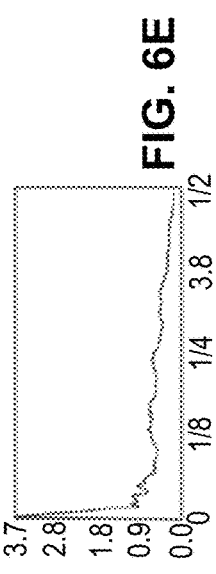
FIG. 6E

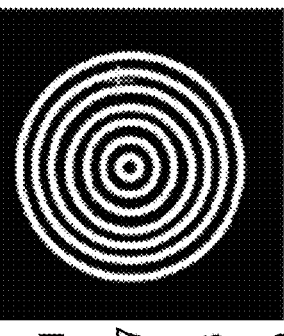
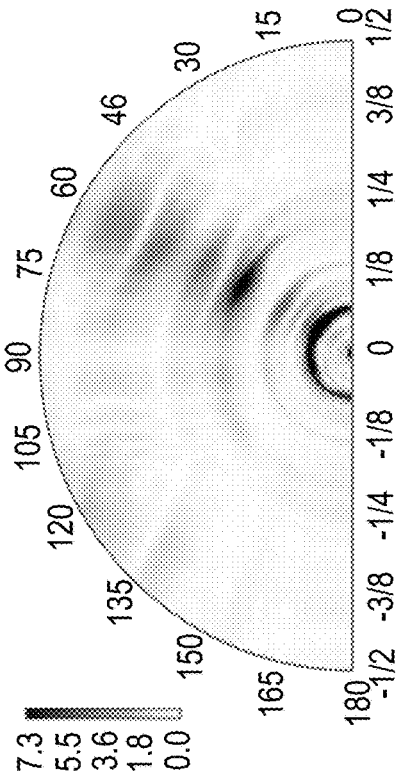
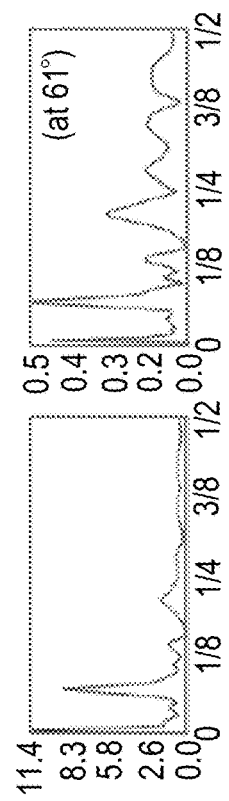
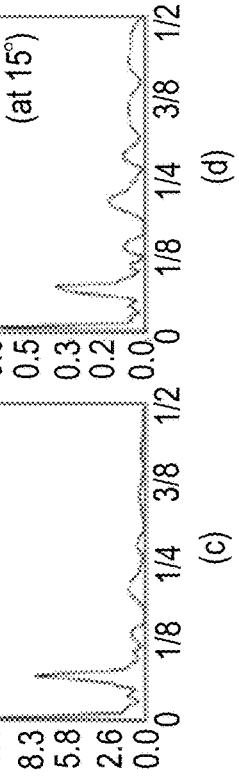
FIG. 7A
FIG. 7B

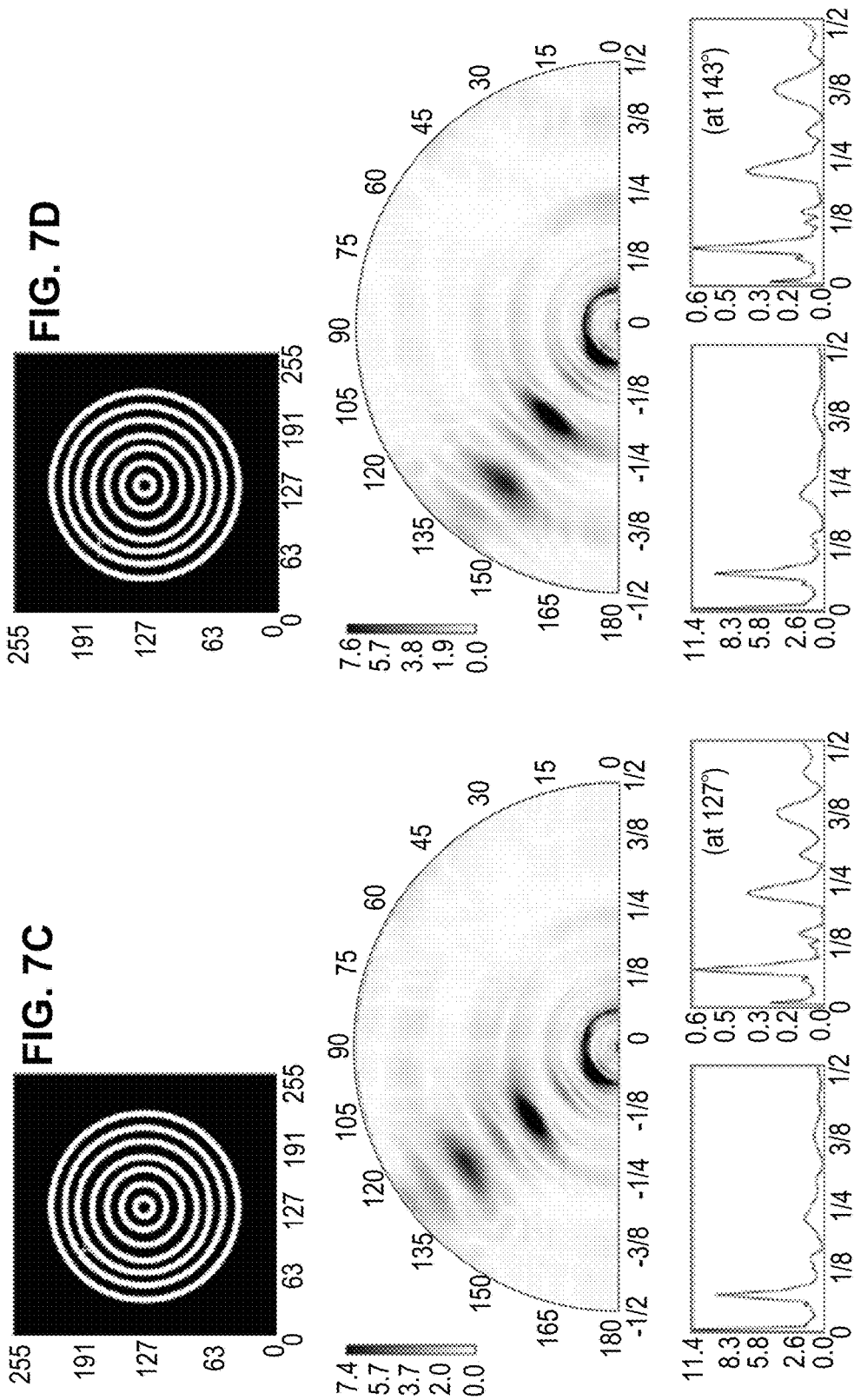

DETERMINING LOCAL SPECTRUM AT A PIXEL USING A ROTATIONALLY INVARIANT S-TRANSFORM (RIST)

CROSS-REFERENCE TO RELATED APPLICATION

This application is a continuation-in-part of U.S. application Ser. No. 14/360,294, filed May 22, 2014, which is a National Stage application under 35 U.S.C. §371 of International Application No. PCTUS2012066450, filed Nov. 23, 2012, which claims the benefit of U.S. Provisional Application Ser. No. 61/562,504, filed on Nov. 22, 2011, entitled "RIST Patent Detailed Description," the disclosure of which is expressly incorporated herein by reference in its entirety.

BACKGROUND

Continuous S-transform (ST) can be regarded as a hybrid of Gabor and continuous wavelet transforms, providing a "time frequency representation" (TFR) of a signal by localizing with a Gaussian window that depends on the frequency. Its discrete 1-dimensional form (1D ST) is finding many applications in processing signals and time series, while its discrete 2-dimensional form (2D ST) is used for processing 2-dimensional data and images, where it should be more correctly called a "space frequency representation" (SFR), as it represents the localized frequency spectrum at each point in the 2-dimensional data set or at each pixel in the image.

Fast Time Frequency Transform tools have been developed, such as a FTFT-1D and FTFT-2D (Fast Time Frequency Transform), that generate discrete 1D ST values and 2D ST magnitudes fast and accurately. The FTFT-2D can produce local ST magnitudes at each pixel in a medical image, as well as ST statistics over a region of interest (ROI) in the image. However, the discretization of 2D ST renderings are not rotationally invariant. By rotational invariance of an SFR, it is meant that when the image is rotated by any angle, the radial component of the SFR is unchanged. This is desirable as the pathology inferred from this radial component should not be affected when the patient is positioned at a different orientation on the imaging couch.

SUMMARY

A method of determining rotational invariant local spectrum at a pixel in an image processing device. The method may include receiving an input image; receiving an input coordinate of the pixel; and determining the values of a rotational invariant form of two-dimensional S-Transform (RIST) at the input coordinate.

In some implementations, the method further includes determining the S-Transform (ST) magnitudes (A1) using positive discretization at the input coordinate of the pixel; flipping the input image along x direction; determining the ST magnitudes (A2) using positive discretization at the coordinate of the corresponding pixel in the flipped image; and determining the average of the above two sets A1 and A2 of magnitudes.

The RIST algorithm may be implemented using a modified form of a FTFT-2D method.

In some implementations, the method may be implemented by a computing device executing the method as computer-executable instructions read from a tangible computer-readable medium.

Some implementations of the subject matter described herein include a computer-implemented method. The method may be performed by a system of one or more computers in one or more locations. The method includes obtaining a first digital image; determining values for a set of features of the first digital image; generating a sample of training data that associates the determined values for the set of features in the first digital image with an observed condition of a subject of the first digital image; training, based on the sample of training data and one or more other samples of training data, a model that is configured to estimate a condition of a subject of a digital image; and using the model to estimate the condition of a subject of a second digital image that is different from the first digital image.

These and other implementations can optionally include one or more of the following features.

The system can determine the values for the set of features of the first digital image by performing an image processing procedure, which is described in further detail in this document in following paragraphs.

Using the model to estimate the condition of the subject of the second digital image can include determining values for a set of features of the first digital image and processing the determined values for the set of features of the second digital image with the model.

The subject of the first digital image can be a lesion and the condition of the subject can be its clinical status, for example, malignant or benign. Thus, a model can be trained to estimate the clinical status of a lesion shown in an image by creating training samples that associate image features derived using the image processing techniques discussed herein with the observed clinical statuses of lesions shown in the images. The observed clinical status may be labelled by a user and is accepted as a true condition of the lesion for purpose of training the model. In another example, the condition of the subject (e.g., lesion) may be the relative abundance of tumor cells in the subject (e.g., lesion). Furthermore, the condition of the subject may be its relationship to a clinical variable with prognostic value. For example, the subject shown in an image may be an anatomical structure such as the hippocampus. The clinical variable may be the patient's cognitive status as measured using a neurological scale such as the Clinical Dementia Rating scale. The features of the digital images may be used to correlate the imaging aspects of the subject with scores on the clinical scale, to provide a non-invasive assessment of cognitive status.

The model can be a machine-learning model (e.g., a neural network), a classifier, a Hidden Markov Model (HMM), a support vector machine (SVM), a diagonal linear discriminate analyzer (DLDA), a diagonal quadratic discriminate analyzer (DQDA), or a combination of these.

One or more computer-readable media may store instructions thereon that, when executed by one or more processors, cause the one or more processors to perform any of the computer-implemented methods described herein.

Some implementations of the subject matter described herein include a computer-implemented method. The method may be performed by a system of one or more computers in one or more locations. The method includes obtaining a first digital image; determining values for a set of features of the first digital image; providing, to a model, the determined values for the set of features of the first digital image to estimate a condition of a subject shown in the image; and presenting an indication of the estimated condition of the subject shown in the image.

These and other implementations can optionally include one or more of the following features.

The system can determine the values for the set of features of the first digital image by performing an image processing procedure, which is described in further detail in this document in following paragraphs.

Presenting the indication of the estimated condition of the subject shown in the image can include displaying the indication visually on an electronic screen, playing the indication aurally via one or more speakers, or both.

Some implementations of the subject matter described herein include a computer-implemented method. The method may be performed by a system of one or more computers in one or more locations. The method can include displaying, on a terminal of the system, a first digital image; receiving a selection of a pixel or a region of interest comprising multiple pixels in the first digital image; determining one or more values that characterize the selected pixel or region of interest; and providing an indication of the determined values that characterize the selected pixel or region of interest.

These and other implementations can optionally include one or more of the following features.

The system can determine the values for the set of features of the first digital image by performing an image processing procedure, which is described in further detail in this document in following paragraphs.

The system may receive the selection of the pixel or the region of interest based on input provided by a user of the system, e.g., a selection of the pixel with a mouse or other pointing device from the display of the first digital image.

Providing the indication of the estimated condition of the subject shown in the image can include displaying the indication visually on the terminal, playing the indication aurally via one or more speakers, or both.

Image Processing Procedure

In some implementations, the image processing procedure can be performed for determining rotational invariant local spectrum at a pixel of an input image. The input image may be, for example, the first digital image from which features are derived for training a model, or the second digital image from which features are derived for estimating a condition of a subject shown in the image. The procedure can include receiving the input image, receiving an input coordinate of the pixel in the image, and determining the values of a rotational invariant form of two-dimensional S-Transform (RIST) at the input coordinate.

The image processing procedure can optionally include one or more of the following features.

The procedure can include determining the S-Transform (ST) magnitudes (A1) using positive discretization at the input coordinate of the pixel; flipping the input image along x direction; determining the ST magnitudes (A2) using positive discretization at the coordinate of the corresponding pixel in the flipped image; and determining the average of the above two sets A1 and A2 of magnitudes.

The procedure can include determining RIST at a pixel using a modified form of the procedure in FTFT-2D.

The procedure can include determining RIST values and statistics in a region of interest (ROI) using a modified form of the procedure in FTFT-2D.

The procedure can include setting parameters; preparing basis values; receiving an input image; determining a two-dimensional Fourier Transform (FT) of the image as a matrix H; receiving an input coordinate of the pixel; determining the ST magnitudes (B1) using positive discretization at the input coordinate of the pixel using the matrix H and the parameters, flipping the input image along the x direction, determining the ST magnitudes (B2) using positive discretization at the coordinate of the corresponding pixel in the flipped image, and determining the average of the above two sets B1 and B2 of magnitudes.

The procedure can include setting parameters; preparing basis values; receiving an input image; determining a two-dimensional Fourier Transform (FT) of the image as a matrix H; receiving an indication of the region on interest (ROI); determining the ST magnitudes (C1) using positive discretization in the ROI using the matrix H and the parameters; flipping the input image along x direction; determining the ST magnitudes (C2) using positive discretization in the corresponding ROI in the flipped image; and determining the average of the above two sets C1 and C2 of magnitudes.

The procedure can include include if the width Nx and height Ny of the input image are not both equal to N, wherein N is a power of 2, then: determine a smallest integer M such that $Nx \leq 2^M$ and $Ny \leq 2^M$; set $N=2^M$; and adjust a size of the input image by expanding the input image into an N×N image by optimized Hanning window.

Preparing basis values for each of the low band, the medium band, and the high band can include: determining support intervals for each pure complex sinusoid; determining a range of PCS, the range being for ST values for values of frequency index $k=0$ through $N/2-1$; identifying a low set of PCS with a relatively small frequency index q, wherein the ST are copied into the basis; identifying a medium set of PCS with a frequency index between the relatively small frequency index q of the low set of PCS and a relatively large frequency index q, wherein the Offset TT-Transform (OTT) are used in the basis; determining crop limits for each pure complex sinusoid in the medium set; identifying basis nodes for each pure complex sinusoid in the medium set; identifying a high set of PCS with the relatively large frequency index q, wherein the Offset TT-Transform (OTT) are used in the basis; determining crop limits for each pure complex sinusoid in the high set; identifying basis nodes for each pure complex sinusoid in the high set; subsampling along a time axis; and determining basis values for each pure complex sinusoid in the high set, the medium set and the low set.

Determining the ST magnitudes can include multiplying a matrix of basis values for N to the matrix H on the left to form an intermediate matrix product; and multiplying a transpose of matrix of basis values for N to the intermediate matrix on the right to form a matrix product of compressed ST magnitudes for the pixel.

The procedure can further include interpolating the matrix of compressed ST values along an x direction; and interpolating a result along a y direction to obtain a matrix of semi-compressed ST values for the pixel.

The procedure can further include decompressing the matrix of semi-compressed ST values for the pixel along the x direction; and decompressing a result along the y direction to obtain a matrix of the ST values at the input coordinate.

Preparing the basis values can further include determining the basis values for the image width Nx using the primary parameters along an x direction; and determining the basis values for the image height Ny using the primary parameters along a y direction.

Determining the ST values can further include determining a bounding rectangle of the ROI.

The procedure can further include, if an x-length of the ROI is greater than a y-length: forming an intermediate matrix product for all ix in an x-projection of the ROI; traversing a pixel tree; and for each node P(ix, iy), if it is in the ROI and not computed before, then multiplying a matrix of basis values for iy to the intermediate matrix product on the right to form a matrix of compressed ST values for the pixel.

The method can further include, if an x-length of the ROI is not greater than a y-length: forming an intermediate matrix product for all iy in a y-projection of the ROI; traversing a pixel tree; and for each node P(ix, iy), if it is in the ROI and not computed before, then multiplying a matrix basis values for iy to the intermediate matrix product on the left to form a matrix of compressed ST values for the pixel.

Determining ST in the ROI can further include determining a local spectrum at each pixel (ix, iy) in the ROI.

Determining ST in an ROI can further include augmenting weights and updating statistics.

The procedure can further include determining a low band, a medium band, and a high band of frequency components, and selecting a skipping strategy to skip computing predetermines ones of the ST values.

The procedure can further include building a forest of quad-trees with two levels; selecting pixels at every other x position and every other y position; for a first two leaves of each tree, corresponding to a pair of diagonally opposite pixels, computing ST values for the low band, the medium band and the high band; determining an upper-difference between ST values of these two pixels at each (kx, ky) in an upper quadrant of a 2D frequency index space; and if the upper-difference is less than a predetermined threshold, skipping computing ST values in the low band, the medium band and the high band for other two leaves in that tree.

The procedure can further include determining low band ST values for each 2×2 square of the ROI; and skipping determining the ST values for the medium band and the high band if a predetermined selection of high band ST magnitude is less than a threshold.

The procedure can further include determining low band ST values for each 4×4 square of the ROI; determining medium band ST values for each 2×2 square of the ROI; building a forest of quad-trees having three levels, wherein at a top level, every fourth x position and every fourth y position is selected; traversing children from a selected x position and y position; and determining a ST value of a pixel in accordance with: if that node is the top level of the tree, then determine its ST values for the low band, the medium band and the high band; if that node is in a middle level, then determine the ST values for the medium band and the high band; and if that node is in a lower level, then determine ST values for the high band.

The procedure can further include performing an automatic selection of a skipping strategy.

The procedure can further include applying a weight to the ST values.

The procedure can further include determining the RIST value as a complex number at a point $(n_x, n_y)$ wherein the input image is an N×N square image.

The procedure can further include determining the complex number in accordance with the relationship:

$$S^*_{RIST}[n_x, n_y, k_x, k_y] = \begin{cases} S_P[n_x, n_y, k_x, k_y] & \text{if } k_x \geq 0, k_y \geq 0 \\ S_P^X[N-1-n_x, n_y, -k_x, k_y] & \text{if } k_x < 0, k_y \geq 0 \\ S_P^Y[n_x, N-1-n_y, k_x, -k_y] & \text{if } k_x \geq 0, k_y < 0 \\ S_P^{XY}[N-1-n_x, N-1-n_y, -k_x, -k_y] & \text{if } k_x < 0, k_y \geq 0 \end{cases}$$

$k_x$ and $k_y$ can take positive and negative values within $N/2-1, \ldots, -1, 0, 1, \ldots, N/2-1$.

The procedure can further include expressing the relationship in a simplified form as follows:

$$|S^*_{RIST}[n_x, n_y, k_x, k_y]| = \begin{cases} |S_P[n_x, n_y, k_x, k_y]| & \text{if } k_x \geq 0, k_y \geq 0 \\ |S_P^X[N-1-n_x, n_y, -k_x, k_y]| & \text{if } k_x < 0, k_y \geq 0 \end{cases}$$

The procedure can further include displaying a semicircle and averaging over the semicircle of radius r to determine a texture curve.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 1A-1C show the magnitudes of the ST values for a real chirp signal and the values found by a "positive discretization" and a "symmetric discretization" definition;

FIG. 2A illustrates a 256×256 MRI image of a diseased brain with a white cross at pixel P(174, 176);

FIG. 2B illustrates the 256×256 MRI image of the diseased brain of FIG. 2A rotated by about −42°, with a white cross at pixel P'(134, 68);

FIGS. 2C and 2D illustrate ST magnitudes at P and P' obtained by positive discretization, with x and y frequency indices on the axes;

FIGS. 2E and 2F illustrate radial components at P and P', with a radius on horizontal axis and radial ST magnitude on vertical axis;

FIG. 2G illustrates radial components at P and P' put together for comparison;

FIGS. 2H and 2L illustrate the same features a FIGS. 2C-2G, however using symmetric discretization;

FIG. 3A illustrates 256×256 MRI image I with a white cross at pixel P(174, 176);

FIG. 3B illustrates the image of FIG. 3A flipped with a white cross at corresponding (81, 176);

FIG. 4A illustrates a 256×256 MRI image of a diseased brain, with a white cross at pixel P(174, 176);

FIG. 4B illustrates a 256×256 MRI image of the diseased brain rotated by about −42° with a white cross at pixel P'(134, 68);

FIGS. 4C and 4D illustrate RIST magnitudes at P and P', with x and y frequency indices on the axes;

FIGS. 4E and 4F illustrate radial components at P and P', with a radius on a horizontal axis and radial ST magnitude on vertical axis;

FIG. 4G illustrates radial components at P and P' put together for comparison;

FIGS. 4H-4L illustrates the same images as FIGS. 4C-4G, but using a FTFT-2D modified for RIST.

FIG. 5A illustrates a 256×256 MRI image of a uniform line pattern with sinusoidal intensities inclined at 45o with a white cross at any point P;

FIG. 5B illustrates a 256×256 MRI image of the uniform line pattern with same separation inclined at 22.5o with a white cross at any point P';

FIGS. 5C and 5D illustrates RIST magnitudes of the two patterns, with x and y frequency indices on the axes;

FIGS. 5E and 5F illustrates radial components of the two patterns, with a radius on a horizontal axis and radial ST magnitude on vertical axis;

FIG. 5G illustrates radial components of the two patterns put together for comparison;

FIG. 6A illustrates 256×256 MRI image of a diseased brain with a white cross at pixel P(174, 176);

FIG. 6B illustrates a 256×256 MRI image of the diseased brain rotated by about −42° with a white cross at pixel P'(134, 68);

FIGS. 6C and 6D illustrate ST magnitudes at P and P' obtained by RIST* with x and y frequency indices on the axes;

FIGS. 6E and 6F illustrate radial components at P and P' from RIST* with a radius on a horizontal axis and radial ST magnitude on vertical axis;

FIGS. 7A-7D illustrate screenshots of a FTFT-RIST tool for an artificial image of concentric circles. It is rotated by four angles such that a specific pixel (shown as a cross) makes angles 15, 61, 127 and 143 degrees with the x-axis.

DETAILED DESCRIPTION

Figure 8:
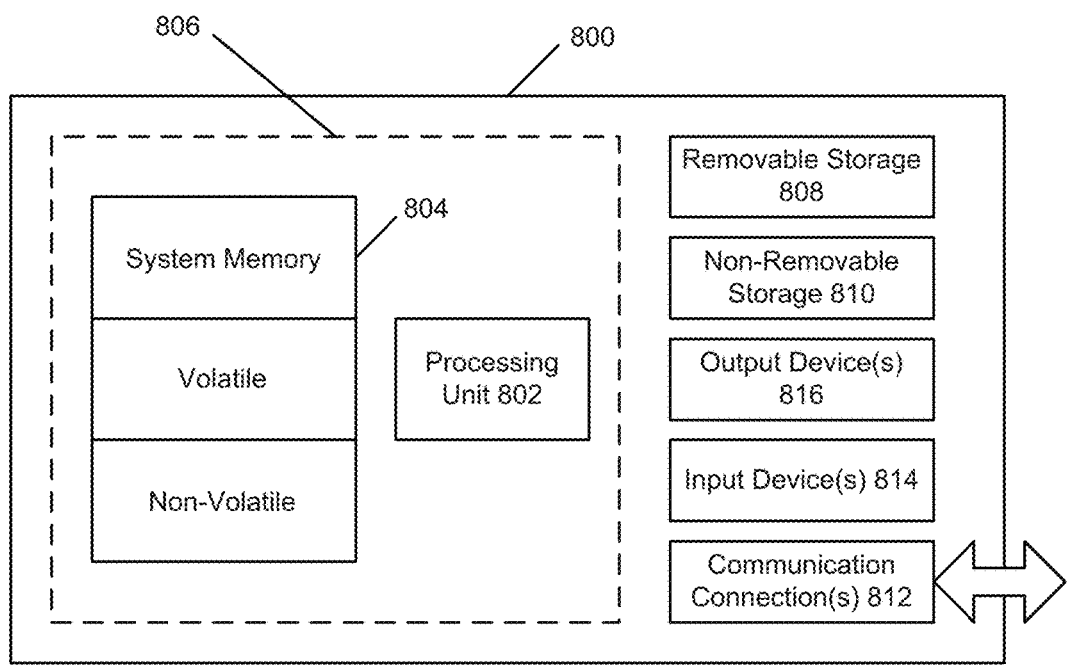
FIG. 8 is a block diagram of an example computing device.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for performing an S-transform in the context of performing image processing techniques, it will become evident to those skilled in the art that the implementations are not limited thereto.

1. Introduction

Below, the present disclosure describes a variant of a 2D S-transform (ST), called a "Rotationally Invariant S-Transform" (RIST), that is substantially rotationally invariant. Regarding the usage of RIST, while the 2D ST is a complex value, the formula of RIST provides a magnitude (modulus) of the complex number, but not the phases. RIST may be used for square images; as such because most medical images are square or can be made so by cropping and padding the image, RIST has applicability to such images. Moreover, the RIST values obtained by the original formulae are inherently not smooth.

As determining the RIST value directly may take a long period of time and/or utilize large amounts of memory a FTFT-2D may be used to generate RIST magnitudes for pixels and RIST statistics for regions of interest quickly and accurately. The FTFT-2D algorithm and tools are disclosed in U.S. Provisional Patent Application No. 61/562,486, filed on Nov. 22, 2011, entitled "FTFT-2D Patent Detailed Description," and U.S. Provisional Patent Application No. 61/562,498, filed on Nov. 22, 2011, entitled "FTFT-2D Patent Detailed Description," the disclosures of which are expressly incorporated herein by reference in their entireties.

RIST magnitudes produced by the FTFT-2D tool may be used for SRF in many medical applications, such as virtual biopsy. Also described herein is another rotationally invariant ST, called RIST*. RIST* may be used in both SFT visualization and spectral analysis. In an implementation, a FTFT-RIST tool displays the values and graphs of RIST* for each pixel or a region of interest (ROI). It also outputs a vector of texture and spectral features based on RIST*.

Below is a discussion of the algorithms from which the RIST and RIST* are derived. The techniques discussed herein may achieve advantages such as reduced computation times and computational expense required to determine image feature values, particularly for very large images that are often encountered in medical diagnostics.

2. Discretization of 1-Dimensional S-Transform

The 1-dimensional Continuous ST of a complex function of time h(t) is a joint complex function of time t and frequency f:

$$S(t, f) = \int_{-\infty}^{\infty} h(\tau) \frac{|f|}{\sqrt{2\pi}} e^{-\frac{f^2(\tau-t)^2}{2}} e^{-i2\pi f\tau} d\tau. \quad (1)$$

The discrete ST for a signal or time series can be found using the frequency domain, derived by the Convolution Theorem. There are two ways to perform the above, which differ in the summation endpoints.

A first is as follows:

$$S_P[n, k] = \begin{cases} \sum_{\kappa=0}^{N-1} H[\kappa+k] e^{-2\pi^2 \kappa^2/k^2} e^{i2\pi\kappa n/N} & \text{if } k \neq 0 \\ \frac{1}{N} \sum_{j=0}^{N-1} h[j] & \text{if } k = 0 \end{cases} \quad (2)$$

A second is as follows:

$$S_S[n, k] = \begin{cases} \sum_{\kappa=-N/2}^{N/2-1} H[\kappa+k] e^{-2\pi^2 \kappa^2/k^2} e^{i2\pi\kappa n/N} & \text{if } k \neq 0 \\ \frac{1}{N} \sum_{j=0}^{N-1} h[j] & \text{if } k = 0 \end{cases} \quad (3)$$

Here, h[n]=h(n) is the discrete time series and H[k]=H(k/N) is its Fourier Transform, assuming that the sampling interval is 1. The values n and k are the time and frequency indices respectively. The value k is equal to Nf where f is the frequency. Herein, the usage of "[ ]" is for discrete functions of integers, while "( )" is for continuous functions of real or complex numbers. In practice, by Nyquist Theorem, the present disclosure seeks to find the ST for f from 0 to 1/2, i.e. for k=0, 1, . . . , N/2–1, as there may not be information to find ST for higher frequencies. The following terms, "positive discretization" and "symmetric discretization" are used respectively to signify that the values taken by the summation index are mostly positive in the former and are almost symmetric in the latter.

FIGS. 1A-1C show the magnitudes of the ST values for a real chirp signal (FIG. 1A) and the values found by the "positive discretization" definition (FIG. 1B) and the "symmetric discretization" definition (FIG. 1C) (shown are ST magnitudes for k=N/2, . . . N−1 for completeness). In some instances, Symmetric discretization provides better results than positive discretization, as such estimates of symmetric-discretization ST values are used.

3. Discretization of 2-Dimensional S-Transform

The 2-dimensional Discrete S-Transform (2D ST) of a complex 2-dimensional $N_x \times N_y$ data set or image is a simple extension of 1D ST. It is assumed that the intensity function $h[n_x, n_y]$ in the image is real. 2D ST is a means of performing SFR. Like 1D ST, its frequency-domain formula has two forms: With positive discretization, the following relationship applies:

$$S_P[n_x, n_y, k_x, k_y] = \sum_{\kappa_x=0}^{N_x-1} \sum_{\kappa_y=0}^{N_y-1} H[\kappa_x + k_x, \kappa_y + k_y] e^{-2\pi^2 \left(\frac{\kappa_x^2}{k_x^2} + \frac{\kappa_y^2}{k_y^2}\right)} e^{i2\pi \left(\frac{\kappa_x n_x}{N_x} + \frac{\kappa_y n_y}{N_y}\right)}, \quad (4)$$

whereas with symmetric discretization, it becomes:

$$S_S[n_x, n_y, k_x, k_y] = \sum_{\kappa_x=-N_x/2}^{N_x/2-1} \sum_{\kappa_y=-N_y/2}^{N_y/2-1} H[\kappa_x + k_x, \kappa_y + k_y] e^{-2\pi^2 \left(\frac{\kappa_x^2}{k_x^2} + \frac{\kappa_y^2}{k_y^2}\right)} e^{i2\pi \left(\frac{\kappa_x n_x}{N_x} + \frac{\kappa_y n_y}{N_y}\right)}. \quad (5)$$

Here, $n_x$, $k_x$, $n_y$, $k_y$ are the time and frequency indices respectively in each direction, and $H[k_x, k_y]$ is the 2-dimensional Fourier Transform. In practice, by Nyquist Theorem, the present disclosure seeks to find the 2D ST for frequency $f_x$ and $f_y$ from 0 to 1/2, i.e. for $k_x$=0, 1, . . . , $N_x$/2−1, and $k_y$=0, 1, . . . , $N_y$/2−1. The above equations are applicable when $k_x$, $k_y$ are positive.

FIG. 2A illustrates a 256☐256 MRI image of a diseased brain with a white cross at pixel P(174, 176). FIG. 2B illustrates the 256☐256 MRI image of the diseased brain of FIG. 2A rotated by about −42°, with a white cross at pixel P'(134, 68). FIGS. 2C and 2D illustrate ST magnitudes at P and P' obtained by positive discretization, with x and y frequency indices on the axes. FIGS. 2E and 2F illustrate radial components at P and P', with a radius on horizontal axis and radial ST magnitude on vertical axis. FIG. 2G illustrates radial components at P and P' put together for comparison. FIGS. 2H and 2L illustrate the same features a FIGS. 2C-2G, however using symmetric discretization.

FIGS. 2C and 2H show the 2D ST magnitudes of a pixel in a 256×256 MRI of FIG. 2A found using relationship (4) and relationship (5) respectively. FIGS. 2E and 2J depict the radial component of 2D ST in the k-space. It is only for square images (N=$N_x$=$N_y$), defined as $$R[n_x, n_y, r] = \frac{\sum_{round(\sqrt{k_x^2+k_y^2})=r} |S[n_x, n_y, k_x, k_y]|}{\sum_{round(\sqrt{k_x^2+k_y^2})=r} 1} \quad (6)$$

for $r = 0, 1, \ldots, N/2 - 1$.

In relationship (6), r is the radius in the k-space. | . . . | stands for the magnitude of the complex ST value. round( ) means the nearest integer of a real number. In implementations, the ST magnitudes for those points in the k-space whose magnitudes do not exceed N/2 are considered. Thus, in FIGS. 2A-2L and all other figures, only a circular sector is displayed. The points outside the sector do not contribute to the texture curve.

3. Transformational Invariances of Space Frequency Representation

For an SFR of a square image several types of transformational invariance may be defined. They are imposed on magnitudes only, as 2-dimensional phases are usually not useful. In practice, it is difficult for any transformational invariance to be satisfied by any SFR exactly (except for reflectional and right-angle rotational invariance of RIST as described in Section 6, below), because of the following concerns: The image is finite with edge effects; the image may not be square (as noted above, it is assumed that the image is square, as in most medical images); the pixel on a rotated image cannot be found that correspond exactly to a given pixel on the original; and a rotated image is a little blurred compared to the original one, due to the interpolation of pixel gray levels during the rotation operation.

3.1 Translational Invariance

An SFR possesses a "translational invariance" property if the following is true: For any image I and its translation I' by any vector (u, v), and for any pixel P($n_x$, $n_y$) on I and the corresponding pixel P'($n_x$+u, $n_y$+v) on I', the SFR magnitude at every ($k_x$, $k_y$) in the k-space for P on I is equal to the SFR magnitude at ($k_x$, $k_y$) for P' on I'. Translational invariance is well satisfied by most SFR. It is easy to show that ST magnitude is translationally invariant (except for the edge effects), and so for RIST, which is formed in terms of ST.

3.2 Rotational Invariance

An SFR possesses "rotational invariance" property if the following is true: For any image I and its rotation I' by any angle θ about any point (a, b), and for any pixel P on I and the corresponding pixel P' on I', the radial component of SFR magnitudes at any radius r in the k-space for P on I is identical to that for P' on I'. Thus, given translational invariance, an SFR that is rotationally invariant about a point (a, b) is also rotationally invariant about any other point (a', b').

In accordance with the present disclosure, the image in FIGS. 2A and 2B is rotated and the ST magnitudes are computed at corresponding points using positive and symmetric discretization. The radial component graphs show that neither discretization of ST can satisfy this rotational invariance. Unlike the other invariances defined in Sections 3.1, 3.3 and 3.4, only a weak rotational invariance can be defined in terms of radial components. For instance a strong rotational invariance is as follows: For any image I and its rotation I' by any angle θ about any point (a, b), and for any pixel P($n_x$, $n_y$) on I and the corresponding pixel P'($n'_x$, $n'_y$) on I', the SFR magnitude at every $(k_x, k_y)$ in the k-space for P on I is equal to the SFR magnitude at $(k'_x, k'_y)$ for P' on I', where $(k'_x, k'_y)$ is the point obtained by rotating $(k_x, k_y)$ in the k-space by the same angle θ. Accordingly, below a RIST* is introduced which is an alternative form of RIST, which roughly satisfies this strong requirement.

3.3 Reflectional Invariances

An SFR possesses a "reflectional invariance about x" property if the following is true: For any image I and its x-reflection $I^X$ about any line x=c (with intensity function $h^X[n_x, n_y]=h[2c-n_x, n_y]$), and for any pixel $P(n_x, n_y)$ on I and the corresponding pixel $P^X(2c-n_x, n_y)$ on $I^X$, the SFR magnitude at every $(k_x, k_y)$ in the k-space for P on I is identical to that at same point $(k_x, k_y)$ for $P^X$ on $I^X$.

An SFR possesses a "reflectional invariance about y" property if the following is true: For any image I and its y-reflection $I^Y$ about any line y=d (with intensity function $h^Y[n_x, n_y]=h[n_x, 2d-n_y]$), and for any pixel $P(n_x, n_y)$ on I and the corresponding pixel $P^Y(n_x, 2d-n_y)$ on $I^Y$, the SFR magnitude at every $(k_x, k_y)$ in the k-space for P on I is identical to that at the same point $(k_x, k_y)$ for $P^Y$ on $I^Y$. Thus, given translational invariance, an SFR that is reflectionally invariant about a line x=c is also reflectionally invariant about any other line x=c'. Similarly for reflectional invariance about y.

An SFR possesses a "diagonal reflectional invariance" property if the following is true: For any image I and its reflection $I^D$ about the diagonal x=y (with intensity function $h^D[n_x, n_y]=h[n_y, n_x]$), and for any pixel $P(n_x, n_y)$ on I and the corresponding pixel $P^D(n_y, n_x)$ on $I^D$, the SFR magnitude at every $(k_x, k_y)$ in the k-space for P on I is identical to that at the diagonally flipped point $(k_y, k_x)$ for $P^D$ on $I^D$. Thus, reflectional invariance about x (respectively y) and diagonal reflectional together imply reflectional invariance about y (respectively x).

3.4 Right-Angle Rotational Invariance

An SFR possesses a "right-angle rotational invariance" property if the following is true: For any image I and its rotation I' by ±90° any point (a, b) and for any pixel P on I and the corresponding pixel P' on I', the SFR magnitude at every $(k_x, k_y)$ in the k-space for P on I is equal to the SFR magnitude at the diagonally flipped point $(k_y, k_x)$ in the k-space for P' on I'. Thus, given translational invariance, an SFR that is right-angle rotationally invariant about a point (a, b) is also right-angle rotationally invariant about any other point (a', b').

It is implied by the conjunction of reflectional invariance about x or y, and the diagonal reflectional invariance, because a rotation by +90° is equivalent to diagonal reflection followed by x-reflection, or to y-reflection followed by the diagonal reflection, and similarly for −90°.

5. Rotationally Invariant S-Transform (RIST)

It is only defined for square images ($N=N_x=N_y$). For an N×N image I with intensity $h[n_x, n_y]$, the 2-dimensional Discrete Rotationally Invariant S-Transform (RIST) magnitude is defined by:

$$|S_{RIST}[n_x, n_y, k_x, k_y]| = \frac{1}{2}(|S_P[n_x, n_y, k_x, k_y]| + |S_P^X[N-1-n_x, n_y, k_x, k_y]|), \quad (7)$$

where $S_P^X[n_x, n_y, k_x, k_y]$ stands for the ST value in positive discretization for the image $I^X$ obtained by flipping the given image along x, i.e. the intensity in $I^X$ is given by $h^X[n_x, n_y]=h[N-1-n_x, n_y]$.

In the present disclosure, the magnitude of RIST has been defined in terms of the magnitudes of ST, without first defining the complex value of RIST, $S_{RIST}[n_x, n_y, k_x, k_y]$, itself. As such, relationship (7) can be expressed in words: For each $(k_x, k_y)$ in the k-space, the RIST magnitude of an image I at pixel $P(n_x, x_y)$ is equal to the arithmetic mean of the positive-discretization ST magnitude of the given image at that pixel and that of the flipped image $I^X$ at the corresponding pixel $P^X(N-1-n_x, n_y)$.

FIGS. 3A and 3B show the two images with N=256, $n_x=174$ and $n_y=176$. In particular, FIG. 3A illustrates 256× 256 MRI image I with a white cross at pixel P(174, 176). FIG. 3B illustrates the image of FIG. 3A flipped with a white cross at corresponding (81, 176). Below, it is shown that relationship (7) satisfies the reflectional (and hence right-angle rotational) invariances defined in Section 3. From examples, relationship (7) roughly satisfies rotational invariance in general.

FIG. 4A illustrates a 256×256 MRI image of a diseased brain, with a white cross at pixel P(174, 176). FIG. 4B illustrates a 256×256 MRI image of the diseased brain rotated by about −42° with a white cross at pixel P'(134, 68). FIGS. 4C and 4D illustrate RIST magnitudes at P and P', with x and y frequency indices on the axes. FIGS. 4E and 4F illustrate radial components at P and P', with a radius on a horizontal axis and radial ST magnitude on vertical axis. FIG. 4G illustrates radial components at P and P' put together for comparison. FIGS. 4H-4L illustrates the same images as FIGS. 4C-4G, but using a FTFT-2D modified for RIST.

FIG. 5A illustrates a 256☐256 MRI image of a uniform line pattern with sinusoidal intensities inclined at 45° with a white cross at any point P. FIG. 5B illustrates a 256☐256 MRI image of the uniform line pattern with same separation inclined at 22.5° with a white cross at any point P'. FIGS. 5C and 5D illustrates RIST magnitudes of the two patterns, with x and y frequency indices on the axes. FIGS. 5E and 5F illustrates radial components of the two patterns, with a radius on a horizontal axis and radial ST magnitude on vertical axis. FIG. 5G illustrates radial components of the two patterns put together for comparison.

As can be shown, the same results can be achieved if the image is flipped along y instead of along x, i.e., $$|S_{RIST}[n_x, n_y, k_x, k_y]| = \quad (8)$$
$$\frac{1}{2}(|S_P[n_x, n_y, k_x, k_y]| + |\bar{S}_P[n_x, N-1-n_y, k_x, k_y]|),$$

where $S_P^Y[n_x, n_y, k_x, k_y]$ stands for the positive-discretization ST value for the image $I^Y$ obtained by flipping the given image along y, i.e. the intensity in $I^Y$ is given by $h^Y[n_x, n_y]=h[n_x, N-1-n_y]$. To prove that relationship (8) is also true, the 2-dimensional Fourier Transforms of an image I and its flipped counterparts $I^X$, $I^Y$ are related by:

$$H^X[k_x,k_y]=H[-k_x,k_y]e^{i2\pi k_x/N}, \quad (9)$$

and $$H^Y[k_x,k_y]=H[k_x,-k_y]e^{i2\pi k_y/N}. \quad (10)$$

Hence, from relationship (4), $$|S_P^X[N-1-n_x, n_y, k_x, k_y]| = \qquad (11)$$

$$\left|\sum_{\kappa_x=0}^{N-1}\sum_{\kappa_y=0}^{N-1} H_P^X[\kappa_x + k_x, \kappa_y + k_y] e^{-2\pi^2\left(\frac{\kappa_x^2}{k_x^2}+\frac{\kappa_y^2}{k_y^2}\right)} e^{i2\pi\left(\frac{\kappa_x(N-1-n_x)}{N}+\frac{\kappa_y n_y}{N}\right)}\right| =$$

$$\left|\sum_{\kappa_x=0}^{N-1}\sum_{\kappa_y=0}^{N-1} H[-\kappa_x - k_x, \kappa_y + k_y]\right.$$

$$\left. e^{-2\pi^2\left(\frac{\kappa_x^2}{k_x^2}+\frac{\kappa_y^2}{k_y^2}\right)} e^{i2\pi\left(\frac{-\kappa_x n_x}{N}+\frac{\kappa_y n_y}{N}\right)} e^{i2\pi k_x/N}\right| =$$

$$\left|\sum_{\kappa_x=0}^{N-1}\sum_{\kappa_y=0}^{N-1} H[-\kappa_x - k_x, \kappa_y + k_y] e^{-2\pi^2\left(\frac{\kappa_x^2}{k_x^2}+\frac{\kappa_y^2}{k_y^2}\right)} e^{i2\pi\left(\frac{-\kappa_x n_x}{N}+\frac{\kappa_y n_y}{N}\right)}\right|.$$

The last equality comes from the fact that $e^{i2\pi k_x/N}$ can be taken outside the double summation and its magnitude is unity. Similarly:

$$|S_P^Y[n_x, N-1-n_y, k_x, k_y]| = \qquad (12)$$

$$\left|\sum_{\kappa_x=0}^{N-1}\sum_{\kappa_y=0}^{N-1} H[\kappa_x + k_x, -\kappa_y - k_y] e^{-2\pi^2\left(\frac{\kappa_x^2}{k_x^2}+\frac{\kappa_y^2}{k_y^2}\right)} e^{i2\pi\left(\frac{\kappa_x n_x}{N}+\frac{-\kappa_y n_y}{N}\right)}\right|.$$

The right-hand sides of relationships (11) and (12) are equal because their summands are complex conjugates, due to the theorem that $H[-a, -b]$ is the complex conjugate of $H[a,b]$ when intensity function h is real. As such:

$$|S_P^Y[n_x, N-1-n_y, k_x, k_y]| = |S_P^X[N-1-n_x, n_y, k_x, k_y]| \qquad (13)$$

and therefore relationship (8) is equivalent to relationship (7).

While there is no rigorous mathematical proof why relationship (7) attains some degree of rotational invariance, experimental results conclude that it is true. However, RIST satisfies right-angle rotational invariance. If the smoothness and small variation of the error function is assumed, then the error should vary from 0 at rotation angle 0° to 0 at angle 90°, through small values at intermediate rotation angles between 0 and 90°. A demonstration of rotational invariance of RIST will be given in Section 9. As RIST magnitude is based on positive discretization, the result is not smooth, as in FIGS. 4C-4F. The FTFT-2D algorithm has a smoothing effect especially for high frequencies, as seen in FIGS. 4H-4K.

6. Reflectional and Right-Angle Rotational Invariances of RIST

By relationship (7), RIST satisfies reflectional invariance exactly about the middle line $x=(N-1)/2$. By the alternative relationship (8), it also satisfies reflectional invariance about the middle line $y=(N-1)/2$. The diagonal reflectional invariance holds for RIST as well. To this end, x and y can be interchanged for each term on the right-hand side of relationship (7) without changing their values, because the order of double summations in relationship (4) and in the formula for 2-dimensional Fourier Transform inside (4) can be swapped. So, relationship (7) becomes:

$$|S_{RIST}[n_x, n_y, k_x, k_y]| = \qquad (14)$$

$$\frac{1}{2}(|S_P^D[n_y, n_x, k_y, k_x]| + |S_P^{DY}[n_y, N-1-n_x, k_y, k_x]|).$$

When x, and y are interchanged, the images are reflected about the diagonal, so in relationship (14), $S_P^D$ may be used instead of $S_P$. Also, the second term is for reflection along y, so $S_P^{DY}$ may be used.

From relationship (8), the right-hand side of relationship (14) is exactly $|S_{RIST}^D[n_y, n_x, k_y, k_x]|$, so the proof is complete. As explained in Section 3.4, above, these reflectional invariances imply right-angle rotational invariance about the centre about the centre $((N-1)/2, (N-1)/2)$ for RIST.

By virtue of translational invariance, it can be deduced that RIST has reflectional invariance about any line x=c and about any line y=d, as well as right-angle rotational invariance about any point. But all these are not exact since translational invariance is not.

7. FTFT-2D Modified for RIST

The FTFT-2D may be modified so that they compute RIST values fast and accurately. By "accurately", it is meant that the results obtained are a reasonable approximation of relationship (7). In particular, given a square image I, the flipped image $I^X$ is created and both images pre-processed. Then, to find the RIST value for a pixel P in I, the FTFT-2D algorithm is applied twice, to find the ST magnitude at P in I and that at the corresponding pixel $P^X$ in $I^X$, for each $(k_x, k_y)$ in the k-space. Finally, the magnitudes are averaged. Like RIST, this modified form of FTFT-2D for RIST satisfies the reflectional (and hence right-angle rotational) invariances. From FIG. 4(h)-(l), it roughly satisfies rotational invariance in general. The time taken to find an RIST value by the new FTFT-2D is slightly more than double that to find ST, but is still very short.

FIGS. 4H-4K show the RIST magnitudes found by this new FTFT-2D, and they appear smoother than that by the exact relationship (7), thanks to the cropping operation inside FTFT-2D that helps remove the noise. For example, the process time is 0.039 seconds, while that using the FTFT-2D to find ST magnitude is 0.018 seconds.

8. Complex RIST* with Signed Frequencies

In accordance with some implementations, an improved form of RIST, called RIST* will now be described. It differs from RIST in several ways. First, it is defined as a complex number, whereas with RIST only a magnitude is defined by relationship (7). Second, it allows the frequency indexes $k_x$ and $k_y$ to be signed, thus enabling a more comprehensive visualization and analysis of the spectral characteristics of the image. Third, it provides a more convincing demonstration of the rotational invariance of RIST. The RIST* value at a point $(n_x, n_y)$ in an N×N square image may be defined as a complex number:

$$S_{RIST}^*[n_x, n_y, k_x, k_y] = \qquad (15)$$

$$\begin{cases} S_P[n_x, n_y, k_x, k_y] & \text{if } k_x \geq 0, k_y \geq 0 \\ S_P^X[N-1-n_x, n_y, -k_x, k_y] & \text{if } k_x < 0, k_y \geq 0 \\ S_P^Y[n_x, N-1-n_y, k_x, -k_y] & \text{if } k_x \geq 0, k_y < 0 \\ S_P^{XY}[N-1-n_x, N-1-n_y, -k_x, -k_y] & \text{if } k_x < 0, k_y < 0 \end{cases}$$

where $k_x$ and $k_y$ can take positive and negative values within $N/2-1, \ldots, -1, 0, 1, \ldots, N/2-1$, and $S_P^{XY}$ means x-reflection followed by y-reflection.

Usually the magnitudes of RIST* are sufficient. Thus, only the cases with non-negative $k_y$ are needed:

$$|S^*_{RIST}[n_x, n_y, k_x, k_y]| = \begin{cases} |S_P[n_x, n_y, k_x, k_y]| & \text{if } k_x \geq 0, k_y \geq 0 \\ |S_P^X[N-1-n_x, n_y, -k_x, k_y]| & \text{if } k_x < 0, k_y \geq 0 \end{cases} \quad (16)$$

The cases with negative $k_y$ are redundant because by relationship (13):

$$|S_P^Y[n_x, N-1-n_y, k_x, k_y]| = |S_P^X[N-1-n_x, n_y, k_x, k_y]|, \quad (17)$$

and, by replacing $S_P$ by $S_P^X$ in relationship (17):

$$|S_P^{XY}[N-1-n_x, N-1-n_y, k_x, k_y]| = |S_P[n_x, n_y, k_x, k_y]|. \quad (18)$$

Hence, only the upper half of RIST* need be drawn.

Similarly to 2D and RIST, the RIST* magnitudes are of interest for those points in the k-space whose magnitudes do not exceed N/2. So the following figures, only a semicircle is displayed. The points outside the semicircle do not contribute to the texture curve. The texture curve for RIST* is formed in the same way as for RIST, by relationship (6), except that RIST* only averages over the semicircle of radius r, not over the quadrant there. From relationship (7) and relationship (16) that the texture curves of RIST and RIST*, shown in FIGS. 4E and 6E, are identical, as they are averaging exactly the same quantities. Like RIST, FTFT-2D can be applied to RIST* as well, producing accurate and smoother results in very short time.

FIG. 6A illustrates 256×256 MRI image of a diseased brain with a white cross at pixel P(174, 176). FIG. 6B illustrates a 256×256 MRI image of the diseased brain rotated by about −42° with a white cross at pixel P'(134, 68). FIGS. 6C and 6D illustrate ST magnitudes at P and P' obtained by RIST* with x and y frequency indices on the axes. FIGS. 6E and 6F illustrate radial components at P and P' from RIST* with a radius on a horizontal axis and radial ST magnitude on vertical axis. FIGS. 6A-6F show the RIST* magnitudes and texture curves for the example of FIGS. 4A-4F. As can be seen, the semicircular of RIST* provides more spectral information than the quadrant of RIST. The above may be provided by a FTFT-RIST tool that that displays the magnitude of RIST* in the semicircle, as well as the texture curve of RIST*. It also divides the semicircle into s equal sectors, where s is specified by the user. Then it finds the sector with the largest average RIST* magnitude and draws the texture curve for this major sector.

FIGS. 7A-7D illustrate screenshots of a FTFT-RIST tool for an artificial image of concentric circles. It is rotated by four angles such that a specific pixel (shown as a cross) makes angles 15, 61, 127 and 143 degrees with the x-axis. Using s=90, it determines the major sector at each rotation. As shown, the major sector is at the same four angles. The texture curve in FIG. 7(c) represents the radial variation of RIST* in all directions, while the major texture curve in FIG. 7(d) is only for that major sector.

FIG. 7 also provides evidence of the strong rotational invariance mentioned in Section 3.2: the semicircular RIST* diagram rotates with the image. As the strong condition implies the weak one, is demonstrates that RIST and RIST* are fairly rotationally invariant.

9. Conclusion

Thus, described above are two methods of formulating a substantially rotationally invariant 2-dimensional discrete SFR based on 2D ST. These new representations, called RIST and RIST*, are different from the discrete ST, but are better in quantifying, visualizing and analyzing localized frequency content in the image. Moreover, the representations provide a very fast way to compute them for a pixel or for an ROI, using modified forms of the FTFT-2D tool. They are useful for spectral analysis of medical images.

In some implementations, the techniques disclosed herein may be applied to more efficiently process images and determine features from the images that are used for generating or evaluating models. In some implementations, image features derived according to the image processing procedures discussed herein may be used to determine particular pixels or regions of interest (e.g., a voxel) of an image that exhibit a particular condition. A computing system may evaluate multiple pixels or regions of interest of an image and select particular ones of the pixels or regions of interest that are determined to exhibit the particular condition, to the exclusion of pixels or regions of interest that are determined not to exhibit the particular condition. The selected pixels or regions of interest may then be highlighted, colorized, or otherwise emphasized in a modified image, to facilitate visualization of portions of a subject shown in the image represented by the pixels or regions of interest that exhibit the particular condition. These techniques may aid the ability of radiologists, for example, to identify and visualize areas of medical images that exhibit particular conditions, which would not be discernible with the naked eye.

10. Exemplary Computing Environment

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes an image processing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/ functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
    obtaining, by a system of one or more computers, a first digital image;
    determining, by the system, values for a set of features of the first digital image, wherein determining the values for the set of features of the first digital image includes:
        receiving an input coordinate of a pixel in the first digital image; and
        determining the values of a rotational invariant form of two-dimensional S-Transform (RIST) at the input coordinate;
    generating, by the system, a sample of training data that associates the determined values for the set of features in the first digital image with an observed condition of a subject of the first digital image;
    determining, by the system and based on the sample of training data and other samples of training data, a model that is configured to estimate a condition of a subject of a digital image; and
    using the model to estimate a condition of a subject of a second digital image that is different from the first digital image.

2. The method of claim 1, wherein determining the values of the RIST at the input coordinate comprises:
    determining a first set of S-Transform (ST) magnitudes (A1) using positive discretization at the input coordinate of the pixel;
    flipping the input image along a specified axis;
    determining a second set of ST magnitudes (A2) using positive discretization at the coordinate of the corresponding pixel in the flipped image; and
    determining an average of the first set of ST magnitudes (A1) and the second set of ST magnitudes (A2).

3. The method of claim 1, wherein determining the values of the RIST at the input coordinate comprises:
    determining RIST at a pixel using a modified form of the method in FTFT-2D.

4. The method of claim 1, wherein determining the values of the RIST at the input coordinate comprises:
    determining RIST values and statistics in a region of interest (ROI) using a modified form of the method in FTFT-2D.

5. The method of claim 1, comprising determining the values of the RIST at the input coordinate as a complex number at a point $(n_x, n_y)$ wherein the input image is an N×N square image.

6. The method of claim 5, further comprising:
    determining the complex number in accordance with the relationship:

$$S^*_{RIST}[n_x, n_y, k_x, k_y] = \begin{cases} S_P[n_x, n_y, k_x, k_y] & \text{if } k_x \geq 0, k_y \geq 0 \\ S_P^X[N-1-n_x, n_y, -k_x, k_y] & \text{if } k_x < 0, k_y \geq 0 \\ S_P^Y[n_x, N-1-n_y, k_x, -k_y] & \text{if } k_x \geq 0, k_y < 0 \\ S_P^{XY}[N-1-n_x, N-1-n_y, -k_x, -k_y] & \text{if } k_x < 0, k_y < 0 \end{cases}.$$

7. The method of claim 1, further comprising:
setting parameters;
preparing basis values;
determining a two-dimensional Fourier Transform (FT) of the first digital image as a matrix H;
determining a first set of S-Transform (ST) magnitudes (B1) using positive discretization at the input coordinate of the pixel in the first digital image using the matrix H and the parameters;
flipping the first digital image along a specified axis;
determining a second set of ST magnitudes (B2) using positive discretization at the input coordinate of the pixel in the first digital image; and
determining an average of the first set of ST magnitudes (B1) and the second set of ST magnitudes (B2).

8. The method of claim 7, wherein flipping the first digital image along the specified axis comprises flipping the first digital image in an x-direction.

9. One or more non-transitory computer-readable media having instructions stored thereon that, when executed by one or more processors, cause performance of operations comprising:
obtaining a first digital image;
determining values for a set of features of the first digital image, wherein determining the values for the set of features of the first digital image includes:
receiving an input coordinate of a pixel in the first digital image; and
determining the values of a rotational invariant form of two-dimensional S-Transform (RIST) at the input coordinate;
generating a sample of training data that associates the determined values for the set of features in the first digital image with an observed condition of a subject of the first digital image;
determining, based on the sample of training data and other samples of training data, a model that is configured to estimate a condition of a subject of a digital image; and
using the model to estimate a condition of a subject of a second digital image that is different from the first digital image.

10. The one or more non-transitory computer-readable media of claim 9, wherein determining the values of the RIST at the input coordinate comprises:
determining a first set of S-Transform (ST) magnitudes (A1) using positive discretization at the input coordinate of the pixel;
flipping the first digital image along a specified axis;
determining a second set of ST magnitudes (A2) using positive discretization at the coordinate of the corresponding pixel in the flipped image; and
determining an average of the first set of ST magnitudes (A1) and the second set of ST magnitudes (A2).

11. The one or more non-transitory computer-readable media of claim 9, wherein determining the values of the RIST at the input coordinate comprises:
determining RIST at a pixel using a modified form of the method in FTFT-2D.

12. The one or more non-transitory computer-readable media of claim 9, wherein determining the values of the RIST at the input coordinate comprises:
determining RIST values and statistics in a region of interest (ROI) using a modified form of the method in FTFT-2D.

13. The one or more non-transitory computer-readable media of claim 9, wherein the operations comprise determining the values of the RIST at the input coordinate as a complex number at a point ($n_x$, $n_y$) wherein the first digital image is an N×N square image.

14. The one or more non-transitory computer-readable media of claim 13, wherein the operations further comprise:
determining the complex number in accordance with the relationship:

$$S^*_{RIST}[n_x, n_y, k_x, k_y] = \begin{cases} S_P[n_x, n_y, k_x, k_y] & \text{if } k_x \geq 0, k_y \geq 0 \\ S_P^X[N-1-n_x, n_y, -k_x, k_y] & \text{if } k_x < 0, k_y \geq 0 \\ S_P^Y[n_x, N-1-n_y, k_x, -k_y] & \text{if } k_x \geq 0, k_y < 0 \\ S_P^{XY}[N-1-n_x, N-1-n_y, -k_x, -k_y] & \text{if } k_x < 0, k_y < 0 \end{cases}.$$

15. The one or more non-transitory computer-readable media of claim 9, wherein the operations further comprise:
setting parameters;
preparing basis values;
determining a two-dimensional Fourier Transform (FT) of the first digital image as a matrix H;
determining a first set of S-Transform (ST) magnitudes (B1) using positive discretization at the input coordinate of the pixel in the first digital image using the matrix H and the parameters;
flipping the first digital image along a specified axis;
determining a second set of ST magnitudes (B2) using positive discretization at the input coordinate of the pixel in the first digital image; and
determining an average of the first set of ST magnitudes (B1) and the second set of ST magnitudes (B2).

16. The one or more non-transitory computer-readable media of claim 15, wherein flipping the first digital image along the specified axis comprises flipping the first digital image in an x-direction.

* * * * *